United States Patent [19]

Hayward et al.

[11] 4,018,900
[45] Apr. 19, 1977

[54] FOOD BARS HAVING FORTIFIED MARSHMALLOW BASE

[75] Inventors: James R. Hayward, McHenry; William L. Keyser, East Dundee; Walter J. Zielinski, Ingleside, all of Ill.

[73] Assignee: The Quaker Oats Company, Chicago, Ill.

[22] Filed: Aug. 2, 1976

[21] Appl. No.: 711,102

[52] U.S. Cl. .................. 426/72; 426/99; 426/103; 426/571
[51] Int. Cl.² ........ A23J 3/02; A23G 3/00
[58] Field of Search ......... 426/571, 103, 659, 660, 426/99, 72

[56] References Cited

UNITED STATES PATENTS

| | | | |
|---|---|---|---|
| 2,520,581 | 8/1950 | Turner et al. | 426/571 |
| 2,929,715 | 3/1960 | Sutton | 426/571 |
| 3,490,920 | 1/1970 | Grettie | 426/571 |
| 3,556,012 | 1/1971 | Parshall | 426/571 |
| 3,607,309 | 9/1971 | Olney | 426/571 |
| 3,682,659 | 8/1972 | Jurczak | 426/571 |
| 3,684,528 | 8/1972 | Batey | 426/571 |

*Primary Examiner*—Jeanette M. Hunter
*Attorney, Agent, or Firm*—Charles J. Hunter; Donnie Rudd

[57] ABSTRACT

A marshmallow for use in food bars and the like is disclosed containing from 1–20 percent by weight fat coated casein and caseinate salts and being low in reducing sugars.

16 Claims, No Drawings

FOOD BARS HAVING FORTIFIED MARSHMALLOW BASE

BACKGROUND OF THE INVENTION

1. FIELD OF THE INVENTION

This invention relates to a food bar having a protein fortified marshmallow base.

2. DESCRIPTION OF THE PRIOR ART

The basic process for the production of marshmallow, as it is known today, was first shown in U.S. Pat. No. 2,600,569 to E. T. Oakes in 1952. This invention was the first showing of the injection of gas into a marshmallow mix to cause it to puff upon relase of the gas pressure. Since that time, many patents have issued showing different additions to marshmallows to provide different flavoring or other features. While U.S. Pat. No. 3,684,528 showed the inclusion of non-fat milk solids into a marshmallow, it showed the mixing thereof with other materials such as sugar, salt, and vanilla concentrate which was absorbed into non-fat milk solids prior to the sealing thereof with a fat coating. This expanded the casein or caseinate salts that were present in the non-fat milk solids to the extent that they absorbed water and gave a fast setting marshmallow-type confection. While the product was desirable in producing a fast setting marshmallow-type confection, the absorption of the moisture by the casein or caseinate salts did not make a soft marshmallow and prevented the marshmallow having the density normally associated with such products.

The inclusion of fats in marshmallows is not a new or novel idea. In U.S. Pat. No. 3,556,012, a thorough discussion of the inclusion of fats in marshmallow is presented with the fats in this case being cocoa butter fat.

In the present invention, however, it has been found that marshmallow can be fortified by inclusion therein of animal and/or plant protein, provided the protein has been fat coated to prevent absorption of water therein and provided the reducing sugars are kept low, i.e. below 5 percent by weight. This combination has not previously been shown and is new and novel with respect to the marshmallow industry.

SUMMARY OF THE INVENTION

It is an object of this invention to provide a food base having a marshmallow base fortified with protein.

It is another object of this invention to provide a protein fortified marshmallow also including fortification by addition of vitamins.

It is an additional object of this invention to provide a system containing marshmallow which is stable against degradation of the fortification products therein.

It is a further object of this invention to provide a new and novel process for producing a marshmallow based product.

The objects of this invention are accomplished by a marshmallow low in reducing sugars and containing from 1 percent to 20 percent by weight fat-coated animal and/or plant protein.

The objects of this invention are further accomplished by marshmallow low in reducing sugars and containing from 1 percent to 20 percent by weight fat coated animal and/or plant protein and fat coated vitamins.

One of the more important vitamins for inclusion in the marshmallow product of this invention is fat coated vitamin C.

The objects of this invention are additionally accomplished by a marshmallow based product low in reducing sugars and having a density of from 111 to 119 ounces per gallon and containing fat coated animal and/or plant protein and fat coated vitamins.

The objects of this invention are still further accomplished by a process for producing a protein fortified marshmallow based product, said process comprising:

A. preparing a marshmallow mix low in reducing sugars;
B. mixing air with the marshmallow mix until the atmospheric pressure density thereof is from about 30 to 74 ounces per gallon;
C. reducing any pressure on the air-marshmallow mix until the pressure is at substantially atmospheric pressure;
D. adding to the mix from 1 percent to 20 percent by weight fat coated animal and/or plant protein; and
E. allowing the mixture to set.

In all processes of this invention, the preferable vitamin for inclusion therein is fat coated vitamin C.

The objects of this invention are still further accomplished by a process for producing a protein fortified marshmallow based product, said process comprising:

A. preparing a marshmallow based product low in reducing sugars and having therein from 1 percent to 20 percent by weight fat coated animal and/or plant protein and a density of from 111 to 119 ounces per gallon;
B. inserting the marshmallow based product into a container along with a water-converting catalyst;
C. displacing the atmosphere in the container with a hydrogen containing atmosphere containing not more than about 4 percent by weight oxygen; and
D. sealing the container to prevent further oxygen from reaching the material.

Preferably in the above process, the inclusion of a fat coated vitamin in the marshmallow is accomplished by adding to the marshmallow a fat coated vitamin coated with a fatty material comprising a saturated aliphatic acid having between 12 and 20 carbon atoms inclusive or a glyceride having the formula:

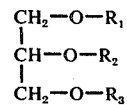

wherein $R_1$ is an acyl radical derived from a saturated aliphatic acid having between 12 and 20 carbon atoms per molecule and $R_2$ and $R_3$ are hydrogen or the same as $R_1$, and said fatty material has a melting point of from 100° F. to 200° F.

Still more preferably in the above is the process wherein the vitamins are coated with the fatty material by admixing the mixture of the vitamins and fatty material with a liquid or solid cooling agent, said cooling agent being admixed in an amount sufficient to solidify the mixture and maintain the mixture solidified throughout the coating process, said cooling agent being non-toxic and being chemically inert with respect to the vitamins and fatty material; subdividing the mixture until a major portion thereof passes through a No. 20 U.S. Sieve but has a particle size above about 75 microns in diameter; and removing the cooling material therefrom by sublimation or evaporation.

The preferable vitamin in the above process is vitamin C.

Still further in addition the objects of this invention are accomplished by in combination: a marshmallow based product low in reducing sugars and containing fat coated animal and/or plant protein, a hermetically sealed container completely encircling the marshmallow, a water converting catalyst within the confines of the container, and an atmosphere surrounding the food product in the container, said atmosphere comprising no more than about 4 percent by weight oxygen and the remainder of the atmosphere comprising an inert gas and sufficient hydrogen to combine with all of the oxygen and convert it to water.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup", we intend to refer to a marshmallow syrup. Depending on the method for marshmallow production, marshmallow syrup usually has a moisture content of about 16 to 30 percent by weight, very little of which is lost in processing. A more detailed description of marshmallow syrup is found later on in this discussion.

Marshmallow syrup generally has a density of approximately 127 ounces per gallon. In the production of marshmallow, marshmallow syrup is whipped and intermixed with an inert, edible gas such as air or nitrogen until the density of the mixture is approximately 44 ounces per gallon. This volumetric expansion, i.e. volume increase of 2 to 3 times, gives marshmallow the characteristic spongy texture which consumers desire. In fact, these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1.0 percent by weight fat. This low fat content has been required in order to prevent excess fat from precluding expansion during whipping and aeration. Since the marshmallow whip is essentially a mixture of ingredients mixed with and whipped with water, very small quantities, i.e. above 1 percent by weight, of fats or oils have heretofore broken this whip preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the emulsion or whip. While these attempts have met minor success in providing incremental increases in fat content, the additional additives have created an off-taste or foreign taste which has made the marshmallow product unacceptable.

A marshmallow mix for use in production herein includes various ingredients which, as described above, include various non reducing saccharides, water, gelatin, and flavoring agents. By use of the term "gelatin" it is intended to mean a glutinous material obtained from animal tissues by prolonged boiling or any of the various substances resembling gelatin in physical properties. Gelatin is sold on the basis of bloom test or jelly test, and gelatin having a bloom test or jelly test of from 150–300 grams is normally considered acceptable for marshmallow production. It is usually preferred, however, to use from 15 to 2.5 percent by weight of a gelatin having a bloom test of from 225–250 grams with variations in bloom test values being compensated for by using less gelatin as the bloom test value increases.

By use herein of the term "marshmallow mix" it is intended to mean those mixed ingredients which are whipped and aerated to produce marshmallow. These include the marshmallow syrups known in the industry, and include by reference the description found in the Krohn and Polito patent, U.S. Pat. No. 3,556,812.

The process of this invention, when the requirement is for the mixing of air with the marshmallow mix until the atmospheric pressure density thereof is from about 30–74 oz. per gallon, is intended to mean those processes in which air can be injected or whipped into the marshmallow mix to give it the requisite density. For instance, the Oakes type gas injection system as previously referred to is perfectly acceptable. Additionally, the whipping therein of air by a simple wire mixer can be sufficient so long as sufficient air is included in the product to insure the requisite density. Additionally other new types of marshmallow equipment well known in the industry are now capable of inserting or injecting sufficient amounts of air into the marshmallow while mixing it to provide at atmospheric pressure the requisite density. If the mixing is not at atmospheric pressure, then prior to the casting or setting thereof the pressure must be reduced until it is approximately atmospheric.

Marshmallow mixes that may be used in this invention are the normal marshmallow mixes well known in the industry with the exception of the reduced amount of reducing sugars. Ingredients used in marshmallow production as well as the amounts thereof are well known in the marshmallow industry. Among the many formulas that are acceptable for marshmallow production are those found in the following: *Candy Making As A Science and Art* by Claude D. Barnette, Don Guessel Publications, Inc., New York, 1960, pp. 99–103; and *Encyclopedia of Candy and Ice Cream Making*, by Simon I. Leon, Chemical Publishing Co., New York, 1959, pp. 294–304; and *A Textbook on Candy Making*, by Alfred E. Leighton, Manufacturing Confectioners Publishing Company, Oak Park, Illinois, 1952, pp. 55–68. A typical formula for use herein would include about 60–85 percent by weight sucrose, about 15–25 percent by weight water; about 2–5 percent by weight invert sugar; and about 1–4 percent by weight gelatin. The typical formula may also include some alternations of the formula such as replacing part or all of the reducing sugars and syrups with non reducing sugars and syrups. Various flavoring agents and humectants may also be added in minor amounts. Preferably, in this invention the marshmallow mix has about 80.1 percent by weight sucrose, about 18.3 percent by weight water, about 1.2 percent by weight gelatin, and about 0.4 percent other ingredients such as flavoring, coloring and preservatives.

The density of the marshmallow produced by this invention must be from 30–74 oz. per gallon at atmospheric pressure, and sufficient air must be inserted therein to produce this requisite density effect. When referring to density of the product it is intended to refer to the density at atmospheric pressure, i.e., gas pressure removed, unless it is otherwise stated.

It is preferred to maintain the aerated marshmallow mixture at a temperature of from about 80° F. to about 90° F. during the processing, however, such other temperatures as may be commonly used in the marshmallow industry are acceptable outside of this preferred range.

In addition to the fortification of the marshmallow by fat coated animal and/or plant protein, the product of this invention may also be fortified by inclusion of fat coated vitamins.

In the process of this invention, the marshmallow mix is first produced. At the same time, the fat coated animal and/or plant protein are produced and set aside. In this case the fat, which is a vegetable oil or fat, must be mixed with the protein until its water binding capability is substantially reduced. After the protein has been rendered substantially incapable of binding water, it is then inserted into the marshmallow mix after aeration thereof. If any pressure is on the product, then it must be reduced until it is at atmospheric pressure at which time the coated protein is inserted in an amount of from 1 percent to 20 percent by weight and the mixture is allowed to set.

It is preferable to include along with the fat coated protein a mixture of fat coated vitamins. Again, the mixture of vitamins must be fat coated prior to inclusion in the product. The preferable inclusion of vitamins in the mixture is one in which vitamin C is one of the utilized vitamins. While it must be understood that the process of this invention produces a marshmallow based product having excellent fortification therein as well as producing a product which is bacteriologically stable, the product can be further enhanced by including it within a system of packaging which prevents deterioration of the fortification over long periods of time. In such a case, the marshmallow based product is produced having the requisite inclusion of material therein and having the requisite density, and further being set, the marshmallow based product is inserted into a container along with the water converting catalyst followed by displacing the atmosphere in the container with hydrogen so that the atmosphere of the container does not contain more than about 4% by weight oxygen, then followed by sealing of the container to prevent further oxygen from reaching the material.

In this process, the marshmallow is inserted into a container along with a water-converting catalyst. The water converting catalyst can be any of the known catalysts that are inert with respect to the product and which are also non-toxic when included in a food package. It has been found, for instance, that it is highly desirable to use a noble metal catalyst, including such things as palladium and platinum catalysts, which are well known to convert a mixture of oxygen and hydrogen to water.

The catalyst can be sandwiched between layers of air permeable material or can be attached to an insert or the container wall or any other such method which gives it contact with the atmosphere in the container without contaminating the product.

After the product is inserted into the container with the water converting catalyst, the atmosphere thereon must be displaced with a hydrogen containing atmosphere containing not more than about 4 percent by weight oxygen. In this case, the hydrogen containing atmosphere must be an inert gas, inert with respect to the product, non-toxic and having sufficient hydrogen to combine with the oxygen, and preferably with an excess, so that there is insurance that all the oxygen is converted. Nitrogen has been found to be a highly acceptable inert atmosphere for inclusion with the hydrogen. The displacing of the atmosphere with the inert gas and hydrogen can be a displacement using a flushing system which flushes completely the surrounding atmosphere in the container, or may be a double flushing system, or a combination of flushing and vacuum relief, or any such combination as long as the end goal of removal of all or substantially all of the oxygen or until at least a maximum of about 4 percent by weight oxygen is achieved. Thereafter, the container is sealed to prevent further oxygen from reaching the product. At such time, gradually over the containing of the product, the catalyst converts the oxygen and hydrogen to water and the produced water is either contained in the container or absorbed by the product. The amount of produced water is so small that it does not have a harmful effect on the product. In such a case the amount of oxygen remaining in the container is so small that it is unable to degrade the protein or vitamins, or to render them ineffective. Additionally, the benefits of the product are such that it does not degrade due to oxygenation of any of the material ingredients withing the marshmallow base, and additionally the sealing of the container prevents the marshmallow based product from losing its moisture and becoming hard. It is preferred in the process of this invention to include in the marshmallow base a fat coated vitamin, coated with a fatty material comprising a saturated aliphatic acid having between 12 and 20 carbon atoms inclusive or a glyceride having the formula:

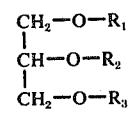

whereby $R_1$ is an acyl radical derived from a saturated aliphatic acid having between 12 and 20 carbon atoms per molecule and $R_2$ and $R_3$ are hydrogen or the same as $R_1$. The fatty material must have a melting point of from 100° F. to 200° F.

The preferable process for producing the coated vitamin is one in which the fatty material is admixed with a mixture of vitamins and then added thereto is a liquid or solid cooling agent, such as liquid nitrogen or liquid or solid carbon dioxide. The cooling agent is admixed in amounts sufficient to solidify the mixture and maintain the mixture solidified throughout the coating process. The cooling agent must be non-toxic and chemically inert with respect to the vitamins and the fatty material. After the mixing of cooling agent, fatty material, and vitamins is completed with complete mixing and solidification of the fatty material, the solid mixture is then subdivided until a major portion thereof passes through a Number 20 U.S. Sieve but has a particle size above about 75 microns in diameter. After this size distribution is achieved, the cooling material is then allowed to remove itself therefrom by sublimation or evaporation. One of the more important vitamins for use in the above process is vitamin C.

DESCRIPTION OF THE PREFERRED EMBODIMENTS

This invention may be more fully described but is not limited by the following examples.

EXAMPLE 1

A marshmallow mix is prepared. For the mixture 0.927 parts by weight gelatin (bloom test strength 250 grams) is added to a first jacketed kettle containing 8.2 parts by weight water. The gelatin is allowed to soak in the water for 5 minutes and then steam is introduced into the jacketed bottle until the temperature of the mixture is 145° F. While maintaining the mixture at 145° F., the mixture is stirred until all the gelatin is dissolved in the water. The mixture is then set aside for inclusion in the process. This mixture is referred to as the gelatin mix. The marshmallow premix is prepared in a second jacketed kettle. For the marshmallow premix 8.3 parts by weight water, 0.067 parts by weight preserviative, 77.2 parts by weight sucrose, 0.046 parts by weight flavoring (vanilla) and 0.21 parts by weight color are added to the jacketed kettle. These ingredients are then stirred until completely mixed. The marshmallow mixture or marshmallow syrup is then prepared by adding the gelatin mix prepared in the first jacketed kettle to the marshmallow premix in the second jacketed kettle. These ingredients are then thoroughly mixed until the mixture is uniform throughout with regard to each of the ingredients. The ingredients are circulated through a heat exchanger and the temperature is reduced to about 75° F. and maintained contstant at that temperature. The mixture is then introduced into a continuous stream into an Oakes continusous marshmallow mixer and beater (The E. T. Oakes Corporation, Islip, New York). The mixer is adjusted so that the aerated marshmallow mixture leaving the mixer is at a temperature of 85° F. plus or minus 3° F. Air is injected into the mixture and the flow rate and pressure of the air are adjusted until samples of the product exposed to atmospheric pressure have a density of about 45–55 oz. per gallon. The pressure of the aerated mixture leaving the mixer is found to fluctuate within the range of about 40–60 psig. The mixture is then introduced into the atmosphere whereupon it expands and has a density of about 50 oz. per gallon. Casein in an amount of 10 parts by weight is mixed with a vegetable fat until the casein cannot retain water. The casein is then thoroughly mixed with the expanded marshmallow mix. The mixture is then allowed to set. The uniformly blended mixture has a moisture content of about 28 percent by weight, a density above 100 oz. per gallon, a sweet marshmallow flavor, and a firm, moist, spongy texture.

EXAMPLE 2

Example 1 is repeated with the exception that a vitamin mix was included in the marshmallow mix. The vitamin mix is prepared by adding vitamin C to a vegetable shortening having a melting point of above 110° F. and then mixing this with carbon dioxide (dry ice) in an amount of about 4 times by weight of the vitamin C and vegetable fat. This mixture is then thoroughly mixed, subdivided and passed through a screen to give a particle size distribution such that it will pass through a No. 20 U.S. Sieve but has a particle size above about 75 microns. The dry ice is then allowed to sublime off of the mixture giving a fat coated vitamin C. About ½ parts by weight of this vitamin mixture is then mixed into the marshmallow mix and the marshmallow process of Example 1 is continued to give a quality product of good taste. The vitamin taste, normally characteristic of vitamins, is not found due to the fat coating of the vitamins.

EXAMPLE 3

Example 1 is repeated with the exception that after the product is produced it is then placed in a container along with a palladium catalyst. The palladium catalyst is sandwiched between two layers of polyethylene which are permeable to the air or atmosphere sufficient to allow it to pass therethrough. The container is then flushed with a mixture containing 8 parts by weight hydrogen and 92 parts by weight nitrogen. After a double flushing with this gas, the product is then sealed in the container to prevent further oxygen from entering the container. After a period of time, the product is found to have high quality and good taste, and the casein added thereto is found to be very stable.

EXAMPLE 4

Example 2 is repeated with the conditions defined in Example 3. Again, an excellent product is produced.

It may thus be seen that this invention provides a new and novel marshmallow based product which is highly desirable in the fortification features and which is stable against deterioration of the fortified ingredients. The coating of the fat onto the protein and the vitamins renders them stable against deterioration due to the moisture and oxygen in the product. These fortified ingredients then maintain their integrity throughout the process and provide a consistently high quality product. Heretofore, a product fortified with both protein, in this case casein, and with vitamins which will remain stable for long periods of time has not been shown, especially coupled with the requirement for low reducing sugar content in the marshmallow.

Having fully described this new and unique invention the following is claimed:

1. Marshmallow, low in reducing sugars and containing from 1 percent to 20 percent by weight fat coated casein or caseinate salts.

2. Marshmallow, low in reducing sugars and containing from 1 percent to 20 percent by weight fat coated casein or caseinate salts and fat coated vitamins.

3. Marshmallow as in claim 1 wherein one of the vitamins is vitamin C.

4. Marshmallow low in reducing sugars and having a density of from 30 to 74 ounces per gallon and containing fat coated casein or caseinate salts.

5. Marshmallow low in reducing sugars having a density of from 30 to 74 ounces per gallon and containing fat coated casein or caseinate salts and fat coated vitamins.

6. Marshmallow as in claim 5 wherein one of the vitamins is vitamin C.

7. A process for producing a protein fortified marshmallow, said process comprising:
  A. preparing a marshmallow mix low in reducing sugars;
  B. mixing air with the marshmallow mix until the atmospheric pressure density thereof is from about 30 to 74 ounces per gallon;

C. reducing any pressure on the air-marshmallow mix until the pressure is substantially atmospheric pressure; and D. inserting from 1 percent to 20 percent by weight fat coated protein in the mix; and allowing the mixture to set.

8. A process as in claim 7, in which the fat coated protein is casein or caseinate salts.

9. A process as in claim 7 which additionally produces a vitamin enriched marshmallow by including fat coated vitamins in the marshmallow mix.

10. A process as in claim 8 in which the vitamins include Vitamin C.

11. A process for producing a protein fortified marshmallow, said process comprising:

A. preparing marshmallow low in reducing sugars and having therein from 1 percent to 20 percent by weight fat coated protein and having a density higher than 74 oz. per gallon;

B. inserting the marshmallow into a container along with a water converting catalyst;

C. displacing the atmosphere in the container with a hydrogen containing atmosphere containing not more than about 4 percent by weight oxygen; and D. sealing the container to prevent further oxygen from reaching the material.

12. A process as in claim 10 further including adding to the marshmallow a fat coated vitamin, said vitamin being coated with a fatty material comprising a saturated aliphatic acid having between 12 and 20 carbon atoms inclusive or a glyceride having the formula:

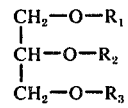

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° F. to 200° F.

13. A process as in claim 11 wherein the vitamins are coated with the fatty material by admixing the mixture of the vitamins and fatty material with a liquid or solid cooling agent, said cooling agent being admixed in an amount sufficient to solidify the mixture and maintain the mixture solidified throughout the coating process, said cooling agent being non-toxic and being chemically inert with respect to the vitamins and fatty material; subdividing the mixture until a major portion thereof passes through a No. 20 U.S. Sieve but has a particle size above about 75 microns in diameter; and removing the cooling material therefrom by sublimation or evaporation.

14. A process as in claim 12 wherein the vitamins include vitamin C.

15. In combination: a food bar comprising marshmallow low in reducing sugars and containing fat coated casein, or caseinate salts, a hermetically sealed container completely encircling the marshmallow, a water converting catalyst within the confines of the container, and an atmosphere surrounding the food product in the container, said atmosphere comprising no more than about 4 percent by weight oxygen and the remainder of the atmosphere comprising an inert gas and sufficient hydrogen to combine with all of the oxygen and convert it to water.

16. The combination as in claim 14 further including fat coated vitamins within the marshmallow.

* * * * *